United States Patent
Arnold et al.

(10) Patent No.: US 7,080,719 B2
(45) Date of Patent: Jul. 25, 2006

(54) WRAP SPRING BRAKE

(75) Inventors: Joseph E. Arnold, Lindstrom, MN (US); Ted J. Perron, White Bear Township, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 10/935,372

(22) Filed: Sep. 7, 2004

(65) Prior Publication Data

US 2006/0049009 A1   Mar. 9, 2006

(51) Int. Cl.
*F16D 63/00* (2006.01)

(52) U.S. Cl. .................... 188/77 W; 188/82.6

(58) Field of Classification Search ........... 188/77 W, 188/82.1, 82.2, 82.3, 82.34, 82.6, 85, 82.4; 254/362, 365, 366, 375, 378, 356; 192/81 R, 192/81 C
See application file for complete search history.

(56) References Cited

U.S. PATENT DOCUMENTS

| | | | |
|---|---|---|---|
| 2,961,217 A * | 11/1960 | Sacchini ................ | 188/82.6 |
| 3,539,041 A * | 11/1970 | Sacchini ................ | 188/82.3 |
| 3,712,155 A | 1/1973 | Stommel et al. | |
| 3,726,371 A | 4/1973 | Versoy | |
| 3,834,670 A | 9/1974 | Pityo | |
| 3,876,184 A * | 4/1975 | Eudy ..................... | 254/362 |
| 3,977,652 A * | 8/1976 | Mauch .................. | 254/375 |
| 4,084,793 A | 4/1978 | Gardiner | |
| 4,132,387 A | 1/1979 | Somerville et al. | |
| 4,143,445 A * | 3/1979 | Fougman ............... | 254/375 |
| 4,190,980 A | 3/1980 | Grycel | |
| 4,199,133 A * | 4/1980 | Gagnon et al. ......... | 254/375 |
| 4,215,850 A | 8/1980 | Haase et al. | |
| 4,234,166 A | 11/1980 | Cederblad | |
| 4,236,694 A | 12/1980 | Kristensson | |
| 4,240,612 A | 12/1980 | Mehnert ................ | 254/365 |
| 4,291,864 A | 9/1981 | Reynolds | |
| 4,312,497 A | 1/1982 | Whaley | |

(Continued)

FOREIGN PATENT DOCUMENTS

GB   1 475 132   6/1977

OTHER PUBLICATIONS

Marquette Metal Products Co., "Industrial Safety-Lock," Series SL, pp. 3.

(Continued)

*Primary Examiner*—Thomas J. Williams
(74) *Attorney, Agent, or Firm*—Dicke, Billig & Czaja, PLLC

(57) ABSTRACT

A winch with a wrap spring brake is provided. The winch includes a rotatable drum configured to wind and unwind a cable. The cable may be connected to a load to be moved. A shaft is coupled to the drum such that rotation of the shaft causes rotation of the drum, thereby winding or unwinding the cable about the drum. The winch also includes an input hub capable of rotating and coupled to the shaft such that rotation of the input hub causes rotation of the shaft. The winch also includes a grounding hub. Finally, the winch includes a wrap spring wound about the grounding hub. The wrap spring has a first end and a second end. The first end of the wrap spring is coupled to the shaft such that the first end rotates with the shaft. The wrap spring is configured to be wrapped down on the grounding hub when the input hub is not rotated, thereby automatically locking the winch.

7 Claims, 8 Drawing Sheets

U.S. PATENT DOCUMENTS

| | | |
|---|---|---|
| 4,334,670 A | 6/1982 | Kawabe |
| 4,379,502 A | 4/1983 | Ball et al. |
| 4,396,102 A | 8/1983 | Beach |
| 4,492,168 A | 1/1985 | Cellai |
| 4,921,219 A | 5/1990 | Ottemann et al. |
| 4,924,795 A | 5/1990 | Ottemann |
| 5,058,720 A | 10/1991 | Rude et al. |
| 5,186,285 A | 2/1993 | Van der Werff ............ 188/82.6 |
| 5,211,124 A | 5/1993 | Reiser |
| 5,374,035 A | 12/1994 | Santos |
| 5,398,911 A | 3/1995 | Holster |
| 5,402,986 A | 4/1995 | Wiltse |
| 6,095,500 A | 8/2000 | McVaugh |
| 2003/0042099 A1 | 3/2003 | Arnold et al. |

OTHER PUBLICATIONS

REELL Precision Manufacturing Corporation, "Mechanical Spring Clutches," Company Brochure, pp. 1.

A copy of PCT International Search Report for International Application No. PCT/US2005/031551 mailed on Dec. 28, 2005 (7 pages).

* cited by examiner

WRAP SPRING BRAKE

BACKGROUND

This invention relates to a wrap spring mechanism that is used as a brake. The wrap spring brake can be configured in a winch to brake a load when an input to the winch is not rotated.

Winches for moving loads are well known in the art. In some applications, winches are operated to move a load, such as moving a boat up and down on a boatlift. To elevate the boatlift, a wheel is rotated causing the rotation of a drum that winds a cable about the drum thereby causing the boatlift to rise. The cooperation of the wheel and drum are typically controlled by a ratchet with teeth engaged with a pawl. The pawl engages the teeth such that the boatlift is held in an elevated position to prevent the unwinding of the cable from the drum. As the wheel is rotated to move the boatlift upward, the pawl is moved over the teeth, typically producing a clicking noise common to winch designs.

In order to prevent the cable from unwinding, a brake pad is often employed to brake the winch. A simple winch design that does away with the pawl and teeth engagement, as well as a brake pad, and yet holds a load safely in an elevated position would be a useful improvement in the art.

SUMMARY

The present invention is a winch with wrap spring brake. The winch includes a rotatable drum configured to wind and unwind a cable. The cable may be connected to a load to be moved. A shaft is coupled to the drum such that rotation of the shaft causes rotation of the drum, thereby winding or unwinding the cable about the drum. The winch also includes an input hub capable of rotating and coupled to the shaft such that rotation of the input hub causes rotation of the shaft. The winch also includes a grounding hub. Finally, the winch includes a wrap spring wound about the grounding hub. The wrap spring has a first end and a second end. The first end of the wrap spring is coupled to the shaft such that the first end rotates with the shaft. The wrap spring is configured to be wrapped down on the grounding hub when the input hub is not rotated, thereby automatically locking the winch.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
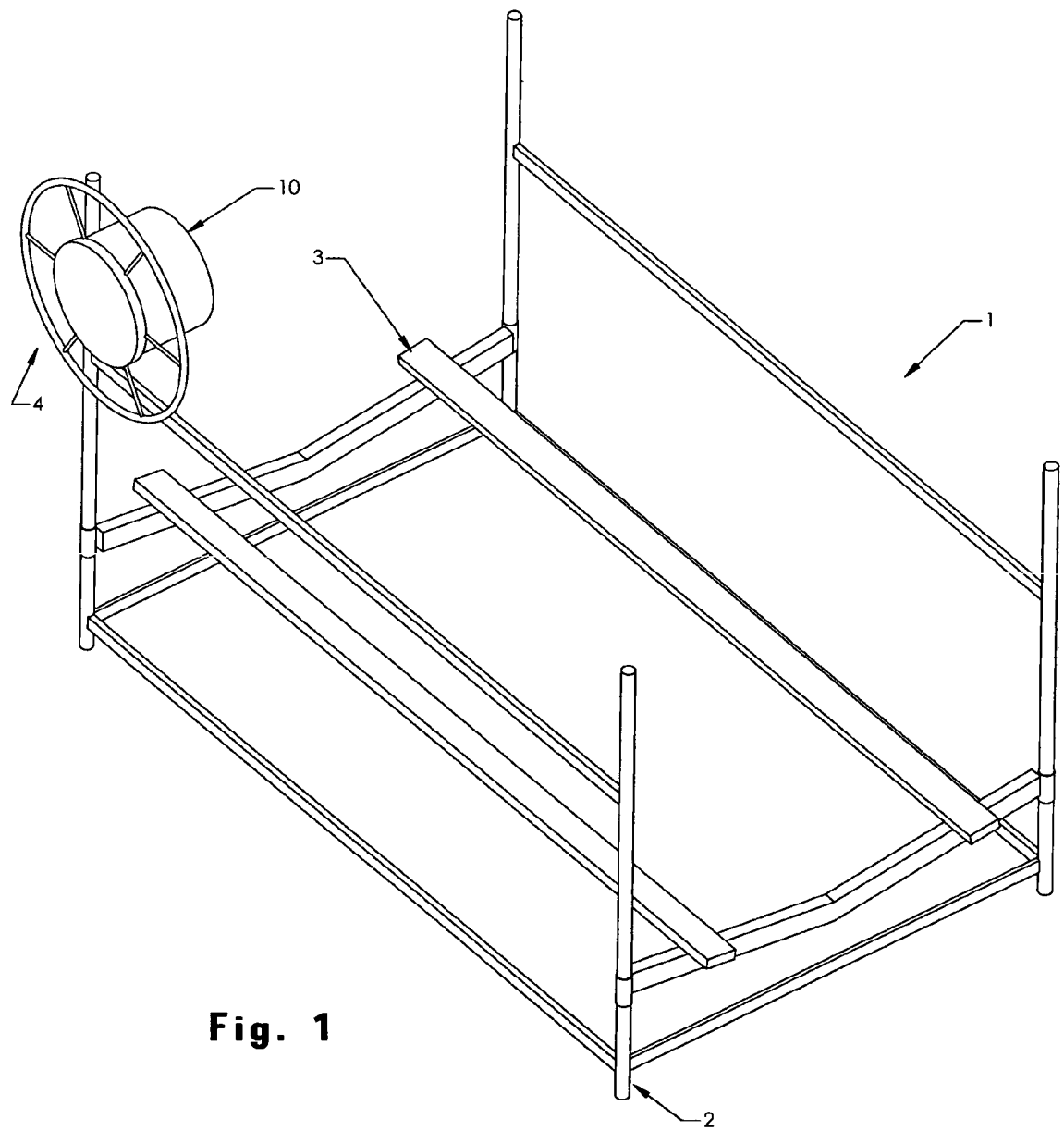
FIG. 1 illustrates a winch with wrap spring brake mounted to a boatlift in accordance with the present invention.

FIG. 1 illustrates a winch with wrap spring brake 10 mounted to a boatlift 1. Boatlift 1 includes a frame 2 and a platform 3, which is movable up and down relative to frame 2. Wrap spring brake 10 is mounted to frame 2 of boatlift 1 and wheel 4 is coupled to the wrap spring brake 10. A cable wraps about a drum, which is coupled to wrap spring brake 10, extends through a series of pulleys fixed to frame 2, and is finally coupled to platform 3.

In operation, wheel 4 can be rotated in a clockwise or counterclockwise direction. Rotating wheel 4 in one direction will cause the cable to wind around the drum causing the cable to lift platform 3 upward relative to frame 2. When wheel 4 is rotated in an opposite direction, the cable unwinds from the drum and causes platform 3 to move downward relative to frame 2. Thus, alternate rotation of wheel 4 causes platform 4, and a boat resting on platform 3, to be moved up and down to various adjusted heights. When wheel 4 is no longer rotated, wrap spring brake 10 advantageously prevents the cable from winding or unwinding from the drum, thereby locking the platform at the adjusted height relative to frame 2. Wrap spring brake 10 does not require actuation of any locking mechanism or device by the user in order to hold the boat on the lift 1 at any adjusted height. Once the user has moved the boat to a desired height by rotating wheel 4, wrap spring brake 10 holds the boat at the adjusted height when the user stops the rotation of wheel 4.

Figure 2:
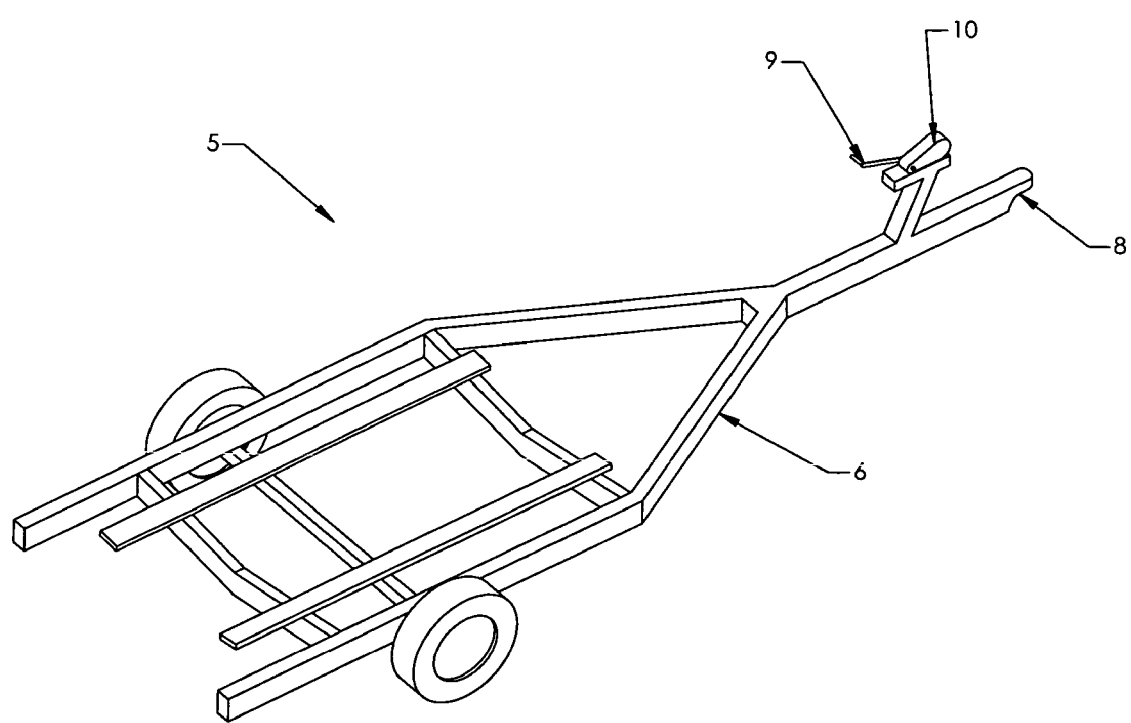
FIG. 2 illustrates a winch with wrap spring brake mounted to a boat trailer in accordance with the present invention.

FIG. 2 illustrates a winch with wrap spring brake 10 mounted to a boat trailer 5. Boat trailer 5 includes a support structure 6 that includes a plurality of rollers and related structural support for supporting a boat on trailer 5. Wrap spring brake 10 is mounted toward the front of trailer 5 and a handle 9 is coupled to the wrap spring brake 10. Trailer 5 includes a hitch attachment 8 for connecting to a vehicle for towing. A cable wraps about a drum, which is coupled to wrap spring brake 10, and is extendable toward the back of trailer 5. The cable can be attached to the front of a boat to pull the boat out of the water and on to trailer 5.

In operation, handle 9 can be rotated in a clockwise or counterclockwise direction. Rotating handle 9 in one direction will wind the cable around the drum causing the cable to pull the boat on to the trailer 5 and out of the water. When handle 9 is rotated in an opposite direction, the cable unwinds from the drum and allows the boat to move off the trailer and into the water. Thus, alternate rotation of handle 9 allows the boat to move on and off the trailer 5. When handle 9 is no longer rotated, wrap spring brake 10 advantageously prevents the cable from winding or unwinding, thereby locking the boat onto the trailer 5. Wrap spring brake 10 does not require actuation of any locking mechanism or device by the user in order to hold the boat on the trailer 5. Once the user has moved the boat to a desired position by rotating handle 9, wrap spring brake 10 holds the boat at the desired position when the user stops the rotation of handle 9.

One skilled in the art will recognize that a wrap spring brake in accordance with the present invention could be employed in a variety of applications in addition to the boat lift and boat trailer examples described above, in order to move loads relative to the wrap spring brake, as well as to hold the load a various positions relative to the wrap spring brake. For example, the wrap spring brake could be couple to an all terrain vehicle or to a hitch of any vehicle for moving loads relative to the vehicle.

Figure 3A:
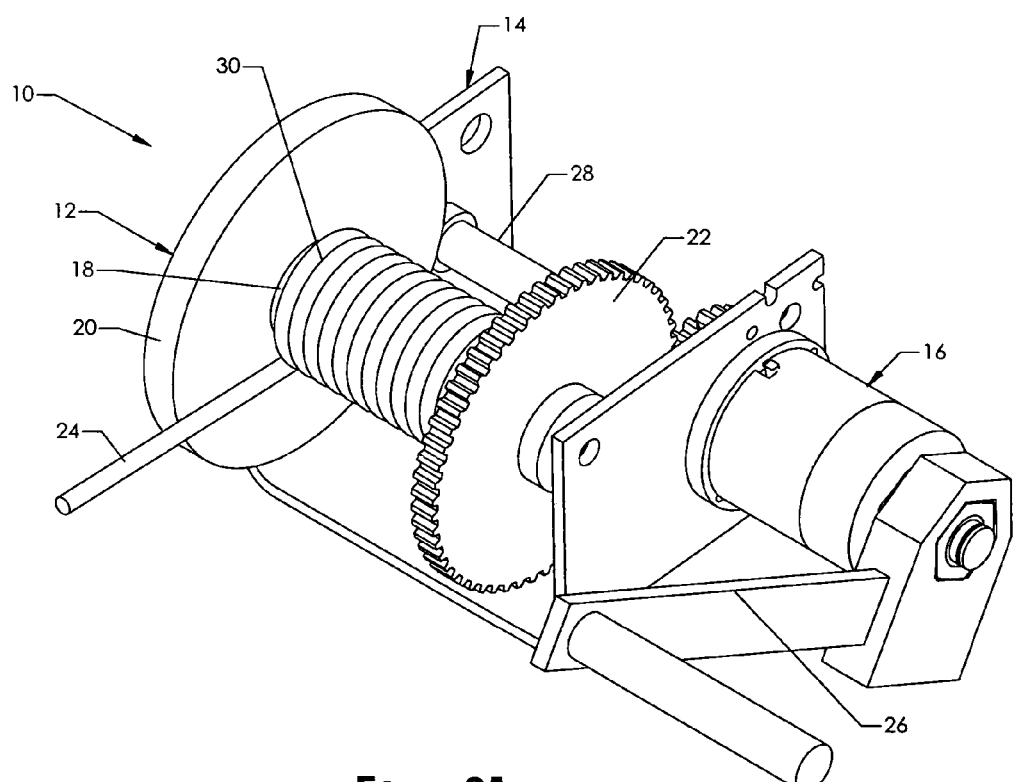
FIG. 3A illustrates a perspective view of a winch with wrap spring brake in accordance with the present invention.
Figure 3B:
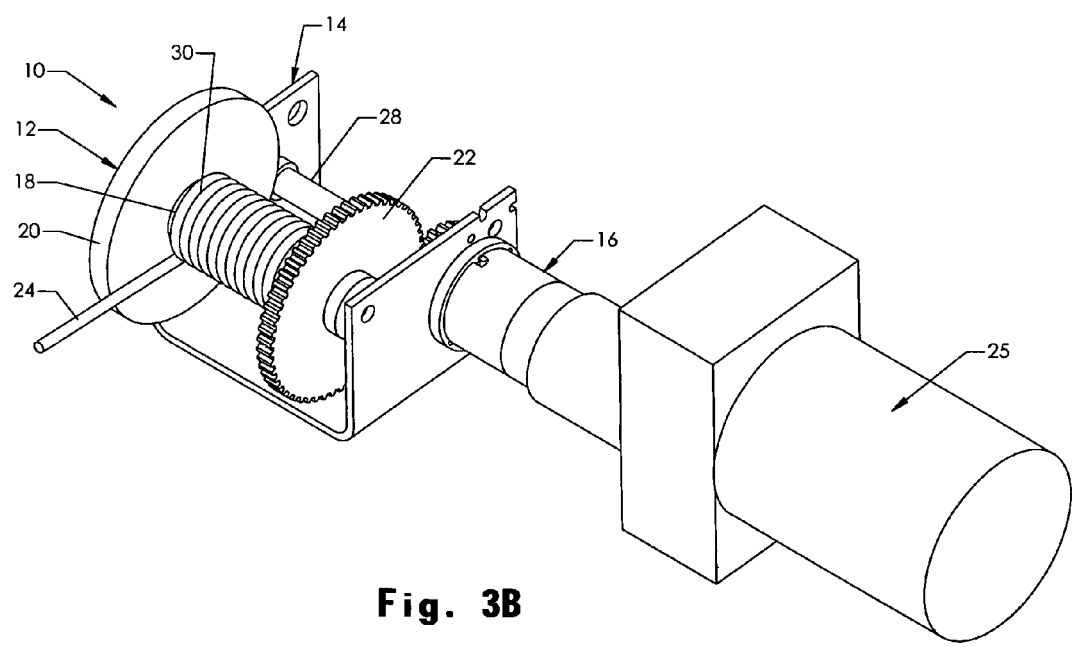
FIG. 3B illustrates a perspective view of an alternative winch with wrap spring brake in accordance with the present invention.

FIGS. 3A and 3B illustrate wrap spring brake 10 configured as a winch in accordance with the present invention. In FIG. 3A, wrap spring brake 10 is illustrated with a hand crank handle 26 and in FIG. 3B, wrap spring brake 10 is illustrated with a motorized crank 25. Wrap spring brake 10 may be used with either handle 26 or with motor 25 in accordance with the present invention. Wrap spring brake 10 includes drum 12, housing or bracket 14, and wrap spring assembly 16. Wrap spring brake 10 is used to move a load relative to wrap spring brake 10. For example, wrap spring brake 10 may be used to raise and lower loads, such as raising and lowering a boat on a boatlift. Wrap spring brake 10 may be mounted to such a boatlift via bracket 14. Similarly, wrap spring brake 10 can be used to move boat on and off a trailer, or such similar tasks.

Drum 12 of wrap spring brake 10 includes drum shaft 18, first rim 20, and second rim 22. In operation, drum 12 rotates in order to wrap a cable 24 about drum shaft 18. Wrap spring assembly 16 includes a handle 26 or a motor 25, which rotate drum 18 thereby raising and lowering loads. Wrap spring assembly 16 also includes pinion shaft 28, which rotates by action of handle 26 (in FIG. 3A) or motor 25 (in FIG. 3B). Pinion shaft 28 is coupled to drum 12 such that handle 26 or motor 25 rotates pinion shaft 28 and drum 12.

Figure 4:
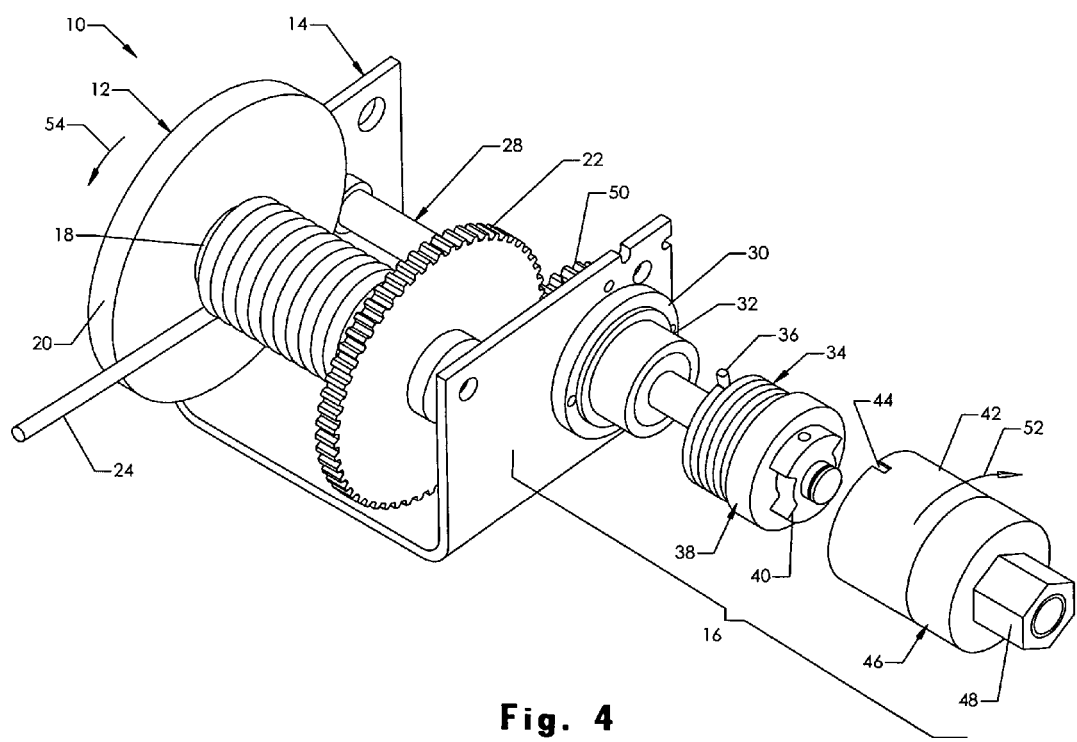
FIG. 4 illustrates an exploded perspective view of the winch with wrap spring brake.

FIG. 4 illustrates an exploded perspective view of wrap spring brake 10 in accordance with the present invention. Wrap spring brake 10 includes drum 12, housing or bracket 14, and wrap spring assembly 16. Wrap spring assembly 16 is exploded in FIG. 4 to further illustrate its various components. Wrap spring assembly 16 includes mounting hub 30, grounding hub 32, wrap spring 34 with spring toe 36, spring hub 38, dog connection 40, spring toe release sleeve 42 with sleeve notch 44, input hub 46, and drive flats 48. Pinion shaft 28 is shown extending through bracket 14 and into wrap spring assembly 16. Pinion gear 50 is mounted over pinion shaft 28. Handle 26 or motor 25 (not illustrated in FIG. 4) is coupled to input hub 46 via drive flats 48 to provide rotation to input hub 46.

Drum 12 is rotatable to wind and unwind cable 24. Drum 12 may be mounted in bracket 14. In one embodiment, pinion shaft 28 extends parallel to drum shaft 18 and pinion shaft engages drum 12 via pinion gear 50 and its engagement with teeth carried on second rim 22 such that pinion shaft 28 and drum 12 will always rotate together. The engagement between pinion gear 50 and drum 12 can be by teeth carried on pinion gear 50 and second rim 22 or other similar configurations. In another embodiment, where a gear ratio is not needed between the shafts, shaft 28 and drum shaft 18 may actually be a common single shaft. Where a gear ratio is advantageous, it can be achieved by an embodiment such as that illustrated in FIG. 4. As one skilled in the art will observe, various gear ratios are achievable, and may be varied, for example, when handle 26 (not illustrated in FIG. 4) is used versus when a motor 25 (not illustrated in FIG. 4) is used to provide an input rotation source to input hub 46.

Shaft 28 extends through mounting hub 30 and grounding hub 32, which are fixed to bracket 14. Wrap spring 34, spring hub 38, dog connection 40, spring toe release sleeve 42 and input hub 46 are each coupled over shaft 28. Electric motor 25, handle 26 (not illustrated in FIG. 4), or other source of input rotation is coupled to input hub 46 via drive flats 48, or some similar attachment mechanism. For ease of explanation, reference will be made to rotating input hub 46 and/or drive flats 48 without reference to a handle or other rotation source. It is understood that rotation of input hub 46 may be accomplished by coupling handle 26, motor 25, or other means of rotation to input hub via drive flats 48.

Wrap spring brake 10 may be operated to move a load, such as moving a boat up and down on a boatlift. Wrap spring brake 10 has an advantageously simple design with few required parts, yet is configured to move a load and to automatically hold the load in various positions and will do so quietly without any clicking. The load to be moved is attached to an end of cable 24 while cable 24 is alternatively wound and unwound about drum shaft 18 thereby moving the load toward and away from wrap spring brake 10.

In operation of wrap spring brake 10, drum 12 may be rotated both clockwise and counterclockwise to alternatively wind and unwind cable 24 about drum shaft 18. In either direction of rotation, drum 12 and second drum rim 22 are driven by pinion gear 50, which is pinned to pinion shaft 28, by the interconnection of teeth carried on second drum rim 22 and pinion gear 50. The rotational control of pinion shaft 28 is in turn accomplished by the combined use of input hub 46, spring toe release sleeve 42, dog connection 40, spring hub 38, wrap spring 34, and grounding hub 32.

In order to move a load connected to cable 24, input hub 46 is rotated. For example, in FIG. 4, to move a load in a direction toward drum 12 ("winding-up" direction), input hub 46 and drive flats 48 are rotated in a direction indicated by arrow 52. Rotation of input hub 46 in the direction of arrow 52 causes drum 12 to rotate in a direction indicated by arrow 54. This causes cable 24 (illustrated in FIG. 3) to wind about drum shaft 18 thereby moving the load toward wrap spring brake 10. In one embodiment, wrap spring brake 10 is mounted to a boatlift with structure frame and a platform that moves up and down relative to the structure frame. Wrap spring brake 10 is configured on the boatlift such that turning handle 26 wraps cable 24 about drum 12 pulling the platform upward toward wrap spring brake 10 causing the boatlift to elevate the boat.

In the winding-up direction (arrow 52), input hub 46 is configured to engage dog connection 40 (this engagement is more fully described in reference to FIG. 5 below). Dog connection 40 may be coupled to, or integrally formed with, spring hub 38. Spring hub 38 and dog connection 40 are also fixed to pinion shaft 28. Consequently, rotation of input hub 46 in the winding-up direction 52 causes input hub 46 to engage dog connection 40 and to thereby rotate dog connection 40, spring hub 38 and pinion shaft 28, because of their interconnection. Pinion gear 50 is fixed to pinion shaft 28. Pinion gear 50 engages second rim 22 of drum 12 such that rotation of pinion shaft 28 and pinion gear 50 in the winding-up direction of arrow 52 in FIG. 4 causes rotation of drum 12 in the direction of arrow 54 in FIG. 4.

In this way, rotation of input hub 46 in the winding-up direction of arrow 52 causes drum 12 to rotate in the direction of arrow 54 such that cable 24 coils about drum 12 as it rotates, causing the load to be advanced toward drum 12. If wrap spring brake 10 is configured on a boatlift, coiling of cable 24 about drum shaft 18 will cause the boat to move upward on the boat lift. Similarly, if wrap spring brake 10 is mounted on the front of a boat trailer, the winding of cable 24 about drum shaft 18 will cause the boat to move forward on the boat trailer.

Wrap spring 34 is helically wrapped about pinion shaft 28. Wrap spring 34 is fixed on one end to spring hub 38 via a press fit or similar means of connection. The other end of wrap spring 34 is bent back away from pinion shaft 28 to form spring toe 36. Wrap spring 34 has an equilibrium state with an equilibrium inner diameter. When wrap spring assembly 16 is fully assembled, at least a portion of wrap spring 34 is placed over grounding hub 32, which has a grounding hub diameter. In one embodiment of wrap spring brake 10, the equilibrium inner diameter of wrap spring 34 is less than the diameter of grounding hub 32.

During the wind-up, that is, as input hub 46 is rotated in the direction of arrow 52 as described above, wrap spring 34 will overrun or slip over grounding hub 32 like a typical overrunning wrap spring. When wrap spring brake 10 is at rest input hub 46 is no longer being rotated, however, the interference between the equilibrium inner diameter of wrap spring 34 with the diameter of grounding hub 32 brakes wrap spring brake 10 such that drum 12 will not rotate. This braking of drum 12 is caused by the interference between wrap spring 34 and grounding hub 32 and does not require actuation of any locking mechanism or related action. By simply stopping the rotation of input hub 46 (for example, by stopping the rotation of handle 26 or motor 25, which are fixed to input hub 46 via drive flats 48), wrap spring brake 10 is braked.

Once the load has been moved toward drum 12 and rotation of input hub 46 stops, the load on cable 24 tends to pull in a direction that would cause a counter rotation of drum 12. This counter rotation is in the direction opposite that indicated by arrow 54 in FIG. 4. This counter rotation of drum 12 is prevented, however, by the interference between wrap spring 34 and grounding hub 32. Since wrap spring 34 is wrapped down onto grounding hub 32, wrap spring brake 10 will automatically lock down such that the load on cable 24 cannot cause rotation of drum 12. Consequently, wrap spring brake 10 provides an automatic brake or lock such that the load is held in place wherever the operator stops moving the load by ending rotation of input hub 46.

For example, if wrap spring brake 10 is installed on a boatlift, once the boat is lifted to a desired elevation, the operator stops rotating handle 26 and the boat will remain at the desired elevation. No locking or other positioning is required by the operator of wrap spring brake 10 and there will be no clicking typically associated with the ratchet and pawl systems. The operator would not need to actuate a locking mechanism or other latch to hold the boat at the elevation. Locking or braking occurs simply by stopping the rotation of handle 26.

When the operator wants to move the load away from drum 12 ("winding-down" direction), such as lowering the boat on the boatlift, the operator simple rotates input hub 46 in a direction opposite that indicated by arrow 52 in FIG. 4. No release or related mechanism needs to be actuated by the operator in order to begin moving the load. Rather, turning input hub 46 in the direction opposite of arrow 52 rotates input hub 46 and spring toe release sleeve 42 in the direction opposite that indicated by arrow 52 in FIG. 4. Spring toe release sleeve 42 is fixed to or integrally formed with input hub 46 such that the rotate together with rotation of drive flats 48.

When fully assembled, spring toe 36 is engaged in sleeve notch 44 such that rotation of spring toe release sleeve 42 in the winding-down direction opposite that indicated by arrow 52 causes sleeve notch 44 to engage spring toe 36. Thus, rotation of spring toe release sleeve in this direction causes wrap spring 34 to wrap open off of grounding hub 32. In other words, wrap spring 34 is expanded and releases its grip on grounding hub 32. Since the opposite end of wrap spring 34 is fixed to spring hub 38, rotation of input hub 46 and spring toe release sleeve 42 in this direction causes pinion shaft 28 and pinion gear 50 to also rotate in this direction. Thus, drum 12 will rotate in a direction opposite that indicated by arrow 54 in FIG. 4. The load on cable 24 will also tend to cause drum 12 to rotate in this direction.

In this way, rotation of input hub 46 in the winding-down direction (opposite that indicated by arrow 52 in FIG. 4) causes drum 12 to rotate in the direction opposite that indicated by arrow 54 in FIG. 4. This causes cable 24 to unwind from drum 12 as it rotates in the direction opposite that indicated by arrow 54, causing the load to move away from wrap spring brake 10. If wrap spring brake 10 is coupled to a boatlift, unwinding of cable 24 about drum shaft 18 will cause the boat to move downward on the boatlift. Similarly, if wrap spring brake 10 is mounted on the front of a boat trailer, the winding of cable 24 about drum shaft 18 will cause the boat to move backward off the boat trailer.

Figure 5A:
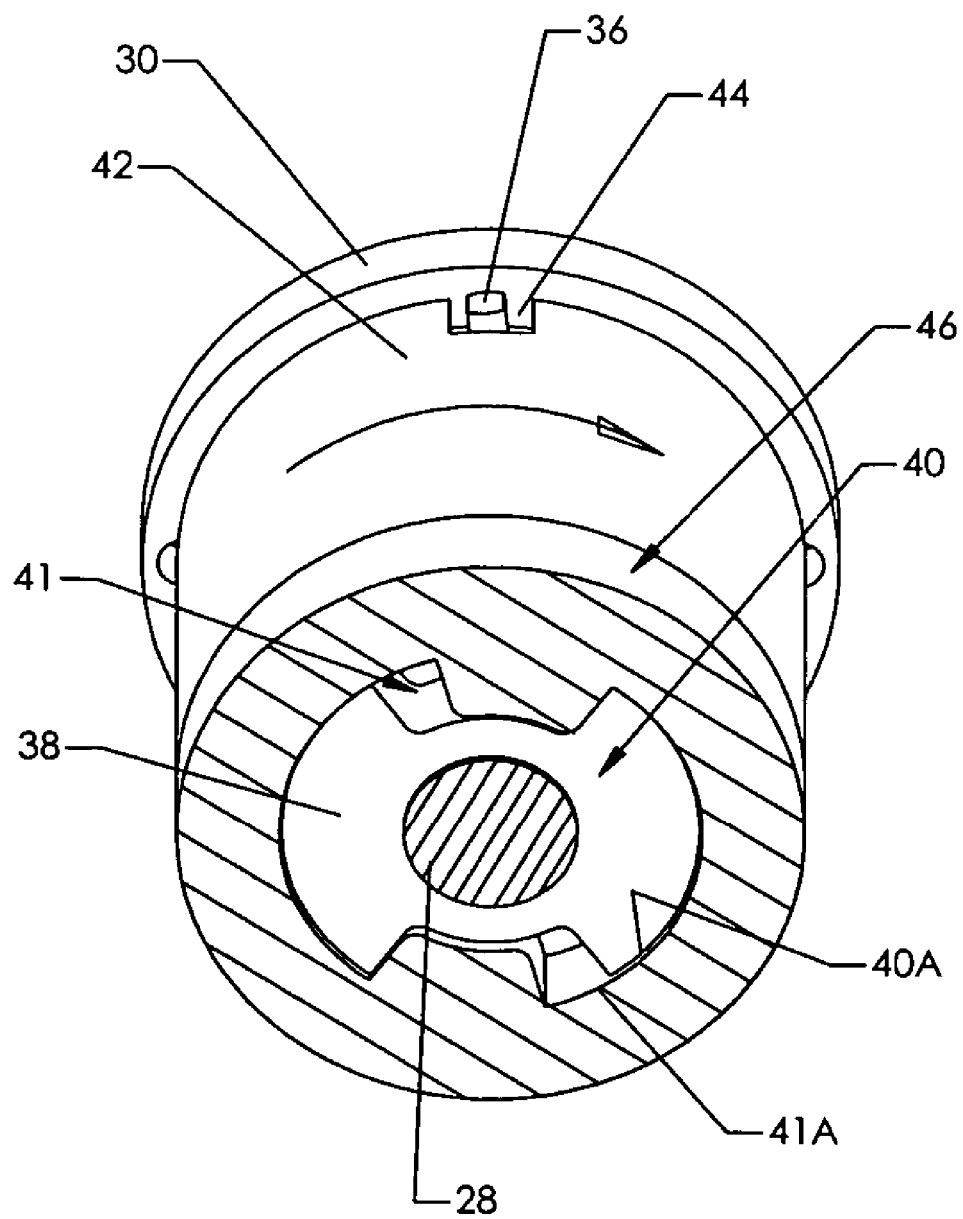
FIG. 5A illustrates a cut-away view of a winch with wrap spring brake in accordance with the present invention in a first position.
Figure 5B:
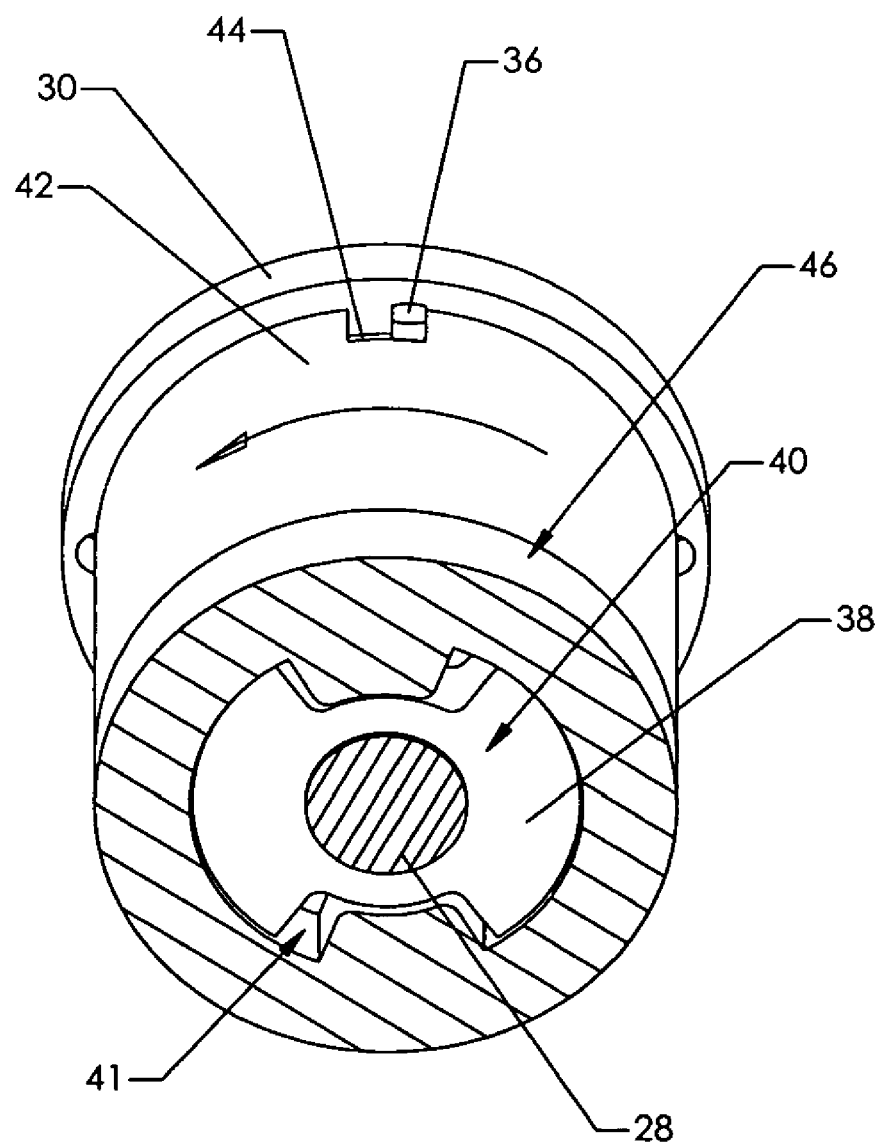
FIG. 5B illustrates another cut-away view of a winch with wrap spring brake in accordance with the present invention in a second position.

FIGS. 5A and 5B further illustrate the interconnection of dog connection 40 of spring hub 38 and dog mating slot 41 of input hub 46. In FIGS. 5A and 5B input hub 46 has been partially cut away to show some of its interior. Specifically, dog mating slot 41 is partially illustrated in FIGS. 5A and 5B and is defined in input hub 46. Dog mating slot 41 is configured to receive dog connection 40. Dog connection 40 is coupled to, or integrally formed with, spring hub 38.

Dog mating slot 41 is configured to be slightly larger than dog connection 40 so that dog connection 40 fits into dog mating slot 41, but may rotate slightly about pinion shaft 28 within dog mating slot 41. Dog connection 40 is illustrated with a connection arc surface 40A that is slightly shorter in length than is a complementary slot arc surface 41A of dog mating slot 41. In this way, in one embodiment dog connection 40 may be rotated 5 to 10 degrees about pinion shaft 28, while still within dog mating slot 41, before input hub 46 engages dog connection 40. Thus, in a certain range of rotation, input hub 46 and spring hub 38 may be rotated 5 to 10 degrees relative to each other about shaft 28 before input hub 46 engages dog connection 40.

This 5 to 10 degrees of axial rotation of dog connection 40 within dog mating slot 41 about shaft 28 is an "axial freedom" between input hub 46 and spring hub 38. This axial freedom is caused by the fact that dog mating slot 41 is slightly larger than dog connection 40, that is, slot arc surface 41A of dog mating slot 41 is slightly longer than is connection arc surface 40A of dog connection 40.

This axial freedom helps wrap spring brake 10 transition from the winding-up direction (illustrated in FIG. 5A) to the winding-down direction (illustrated in 5B). When wrap spring brake 10 is in the winding-up direction, input hub 46 engages dog connection 40 such that rotation of input hub 46 also causes rotation of dog connection 40, spring hub 38, and wrap spring 34, which will overrun or slip over grounding hub 32. Then, when wrap spring brake 10 changes to rotate in the winding-down direction, wrap spring 34 must be allowed to release grounding hub 32 in order for winding in this direction to occur. The axial freedom between input hub 46 and spring hub 38 allows wrap spring 34 to release from grounding hub 32.

The axial freedom between input hub 46 and dog connection 40 also allows pinion shaft 28 to be driven in the winding-down direction through wrap spring 34. In other words, rotation of input hub 46 in the winding-down direction rotates input hub 46 and sleeve 42 by their interconnection. Since there is axial freedom between input hub 46 and spring hub 38 by virtue of dog mating slot 41 defined within input hub 46 being slightly larger than dog connection 40, input hub 46 will not immediately engage dog connection 40. The axial freedom between them, in one embodiment 5 to 10 degrees, must be traversed before input hub 46 will engage dog connection 40. Before this occurs, however, in one embodiment notch 44 in sleeve 42 will engage spring toe 36 and cause wrap spring 34 to rotate, thereby driving spring hub 38 and pinion shaft 28.

Thus, pinion shaft 28 will normally be driven through wrap spring 34 in the winding-down direction. In some cases, however, where there is no load coupled to drum 12 wrap spring 34 may be deflected far enough that the axial freedom between input hub 46 and spring hub 38 will be traversed such that input hub 46 and dog connection 40 do contact. In this case, input hub 46 will drive dog connection 40 and pinion shaft 28. In this way, wrap spring 34 is protected from potentially being compromised or broken in cases where no load is moved in the winding-down direction with wrap spring brake 10.

As one skilled in the art will recognize, the axial freedom achieved between input hub 46 and dog connection 40 by the interaction of dog connection 40 and dog mating slot 41 can also be achieved by other similar means. For example, a pin could be fixed eccentrically relative to spring hub 38 or to pinion shaft 28. Furthermore, a receiving groove may be provided in input hub 46, into which the pin is received. The groove would lie upon an arc that is in a circle concentric to shaft 28 in input hub 46. The groove could be of an adjustable length so that various degrees of axial freedom of spring hub 38 relative to input hub 46 are achieved. Other means of achieving axial freedom between spring hub 38 and input hub 46 are possible.

Figure 6:
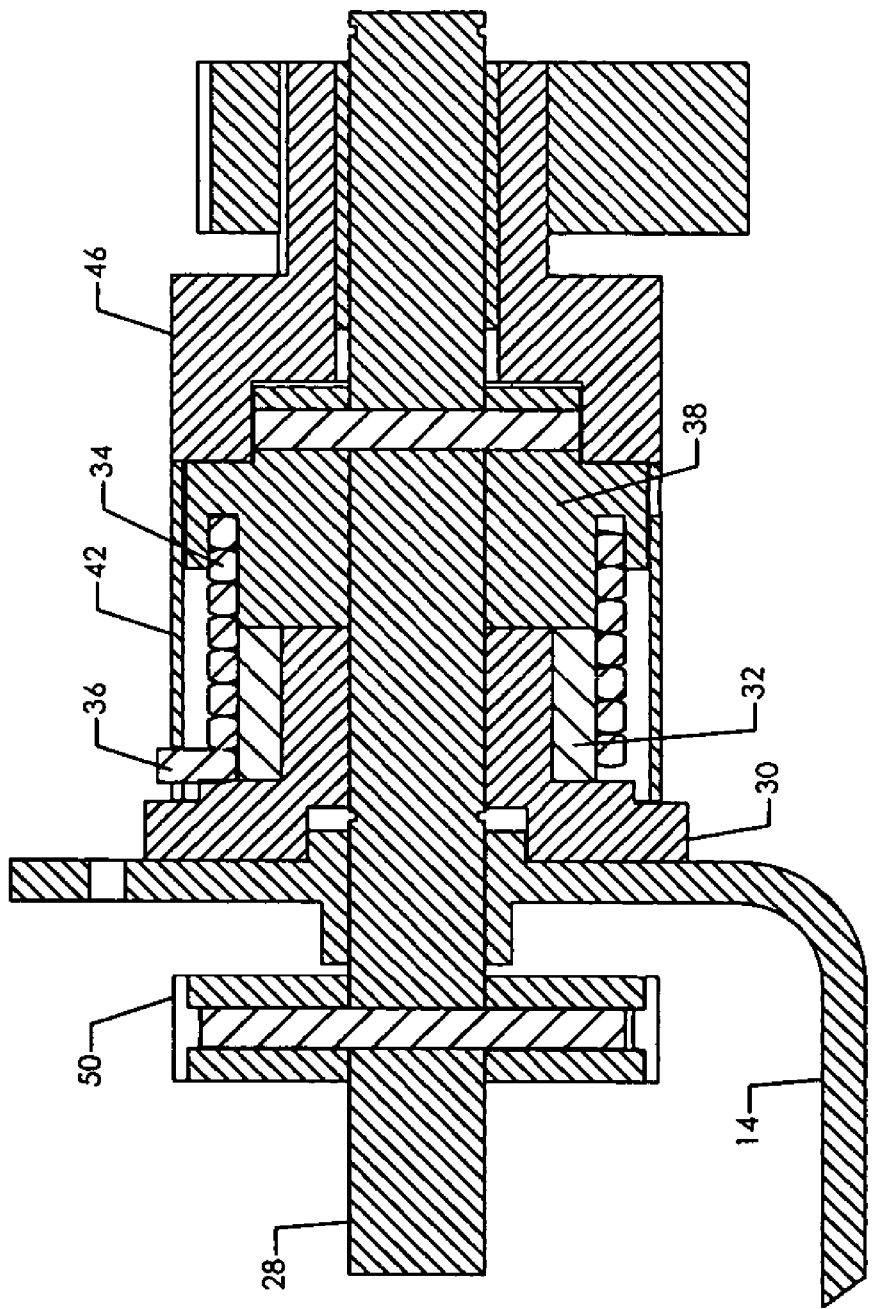
FIG. 6 illustrates a cross-sectional view of the winch with wrap spring brake.

FIG. 6 illustrates a cross section of a portion of wrap spring brake 10 in accordance with the present invention. Wrap spring brake 10 includes bracket 14, mounting hub 30, grounding hub 32, wrap spring 34 with spring toe 36, spring hub 38, spring toe release sleeve 42, and input hub 46. Pinion shaft 28 is illustrated extending through bracket 14, mounting hub 30 and spring hub 38. Pinion gear 50 is illustrated mounted on pinion shaft 28.

Wrap spring brake 10 is illustrated fully assembled in FIG. 6. Wrap spring 34 is illustrated wrapped around pinion shaft 28, grounding hub 32, and spring hub 38. Wrap spring 34 has two ends, one of which is fixed to spring hub 38. This connection of the end of wrap spring 34 to spring hub 38 can be by a press fit, with a weld, with a bent end tucked into spring hub 38, or similar means of connection. The other end of wrap spring 34 is bent back away from pinion shaft 28 to form spring toe 36. Spring toe 36 is configured to engage spring toe release sleeve 42 such that rotation of spring toe release sleeve 42 will cause engagement between spring toe release sleeve 42 and spring toe 36. One skilled in the art will recognize that other configurations of wrap spring 34 with spring toe 36 are possible to achieve the advantages of the present invention.

In one embodiment, wrap spring 34 is configured with an equilibrium state inner diameter smaller than the diameter of grounding hub 32 such that wrap spring 34 will engage grounding hub 32 preventing any rotation and braking wrap spring brake 10. Thus, wrap spring brake 10 is a simplified configuration with relatively few components for moving a load toward and away from a wrap spring brake. Wrap spring brake 10 is a very compact mechanism, which automatically locks the wrap spring brake when a load is attached so that a load is held steady when wrap spring brake 10 is not is use. This locking of the wrap spring brake is achieved without use of hydraulics, ratchet release mechanisms, worm drives or other similar additional mechanical devices.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, the wrap spring brake is described using a cable, but one skilled in the art will recognize that a variety of mechanisms, such as ropes, chains and related lines can be used consistent with the present invention. This application is intended to cover any adaptations or variations of the specific embodiments discussed herein. Therefore, it is intended that this invention be limited only by the claims and the equivalents thereof.

What is claimed is:

1. A wrap spring brake comprising:
   an input source that is alternatively rotated in a first direction, in a second direction and held stationary;
   a cylindrical sleeve coupled to the input source, the cylndrical sleeve having a mating slot and a notch;
   a rotatable output shaft;
   a rotatable spring hub fixed to the output shaft, the spring hub having a dog connection configured to engage the mating slot;
   a grounding hub through which the output shaft extends;
   a wrap spring wound over the grounding hub, the wrap spring having a first end and a second end, the first end of the wrap spring coupled to the spring hub and the second end forming a spring toe; and
   wherein when the input source rotates in the first direction the mating slot engages the dog connection thereby rotating the output shaft in the first direction and causing the wrap spring to overrun the grounding hub, when the input source rotates in the second direction the notch engages the toe of the wrap spring thereby releasing the wrap spring from the grounding hub and the output shaft is caused to rotate in the second direction, and when the input source is stationary the wrap spring is wrapped down on the grounding hub thereby preventing any rotation of the output shaft.

2. The wrap spring brake of claim 1 wherein the input source is a rotatable handle.

3. The wrap spring brake of claim 1 wherein the input source is an electric motor.

4. The wrap spring brake of claim 1 further including a rotatable drum with a cable configured to wind and unwind about the drum, the drum coupled to the output shaft such that it rotates therewith.

5. The wrap spring brake of claim 1 wherein the mating slot is larger than the dog connection such that there is a clearance between the dog connection and the mating, and wherein the notch of the control element will engage the spring toe and release the wrap spring before the dog connection engages the mating slot when the input is rotated in the second direction.

6. The wrap spring brake of claim 1 wherein there is a 5–10 degree clearance between the dog connection and the mating slot such that the input must be rotated 5–10 degrees in the second direction before the dog connection engages the mating slot.

7. A wrap spring brake winch comprising:
- a rotatable drum configured to wind and unwind a cable having a first and a second end, the first end of the cable connected to a load, the second end of the cable connected to the drum, and the load tending to unwind the cable from the drum;
- a shaft coupled to the drum such that rotation of the shaft causes rotation of the drum;
- in input hub capable of rotation;
- wrap spring assembly means coupled between the input hub and the shaft for causing the shaft to rotate when the input hub is rotated and for preventing the shaft from rotating when the input hub is not rotated and the load is connected to the cable thereby preventing the cable form unwinding from the drum;
- wherein the wrap spring assembly means includes a spring hub, a grounding hub and a wrap spring wound about the grounding hub, the wrap spring having a first end and a second end, the first end of the wrap spring coupled to the spring hub and the spring hub being coupled to the shaft such that the first end rotates with the shaft the wrap spring configured to rotate over the grounding hub without interference when the input hub is rotated in one direction and configured to be wrapped down on the grounding hub when the input hub is not rotated: and
- wherein the spring hub includes a dog connection and the input hub includes a dog mating slot such that there is axial freedom between the spring hub and the input hub about the shaft.

* * * * *